US006471815B1

(12) United States Patent
Mace

(10) Patent No.: US 6,471,815 B1
(45) Date of Patent: Oct. 29, 2002

(54) LABELING AND MANUFACTURING METHOD UTILIZING TEMPORARY ADHESIVE PATCHES

(75) Inventor: Brian Allen Mace, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 09/756,572

(22) Filed: Apr. 18, 2001

(51) Int. Cl.[7] ............................ B32B 31/04; B65C 1/00

(52) U.S. Cl. ................. 156/249; 156/247; 156/DIG. 1; 156/DIG. 2

(58) Field of Search ................................. 156/247, 249, 156/DIG. 1, DIG. 2

(56) References Cited

U.S. PATENT DOCUMENTS 4,521,267 A * 6/1985 Jacobson .................... 156/249
5,628,858 A * 5/1997 Petrou ........................ 156/249
5,823,349 A 10/1998 Bridges
5,987,553 A 11/1999 Swamy et al.
6,086,702 A * 7/2000 Rea ............................ 156/247
6,273,986 B1 * 8/2001 Egan ...................... 156/247 X

* cited by examiner

*Primary Examiner*—Curtis Mayes
(74) *Attorney, Agent, or Firm*—Haynes and Boone, LLP

(57) ABSTRACT

A labeling and manufacturing method according to which labels are applied to a device utilizing temporary adhesive patches. The patch carrying the label is later removed from the device. The label is separated from the patch, the patch is discarded and the label is permanently attached to the device.

23 Claims, 2 Drawing Sheets

LABELING AND MANUFACTURING METHOD UTILIZING TEMPORARY ADHESIVE PATCHES

BACKGROUND

This disclosure relates to a labeling and manufacturing method for applying labels to a device utilizing temporary adhesive patches in a build-to-order environment.

This application relates to U.S. Pat. No. 6,314,337, issued on Nov. 6, 2001, entitled Automated Consolidation Station, naming Lorne Marcum as inventor. The issued patent is incorporated herein by reference in its entirety, and is assigned to the assignee of the present disclosure.

In many manufacturing assembly lines, various labels must be applied to the device being manufactured and/or tested, especially in connection with electronic devices, such as computers.

However, because these labels often must be permanently applied to the device being manufactured at an early stage of manufacturing for identification purposes, and cannot be stored further down the assembly line, they are wasted when they are damaged or when the device fails, or is damaged, during the later stages of the manufacturing process. Because labels are relatively expensive, this can significantly increase the manufacturing costs.

Therefore, what is needed is a manufacturing method according to which a label is temporarily attached to the device being manufactured at an initial stage of the manufacturing process, and then is permanently attached at the end of the process. Thus, if the label is damaged, or if the device being manufactured fails or is damaged during the manufacturing process, the label can be used on another device.

SUMMARY

According to an embodiment, a label is temporarily attached to the device being manufactured at an early stage of the manufacturing process, and then is permanently attached at a later stage of the process.

DETAILED DESCRIPTION

Figure 1:
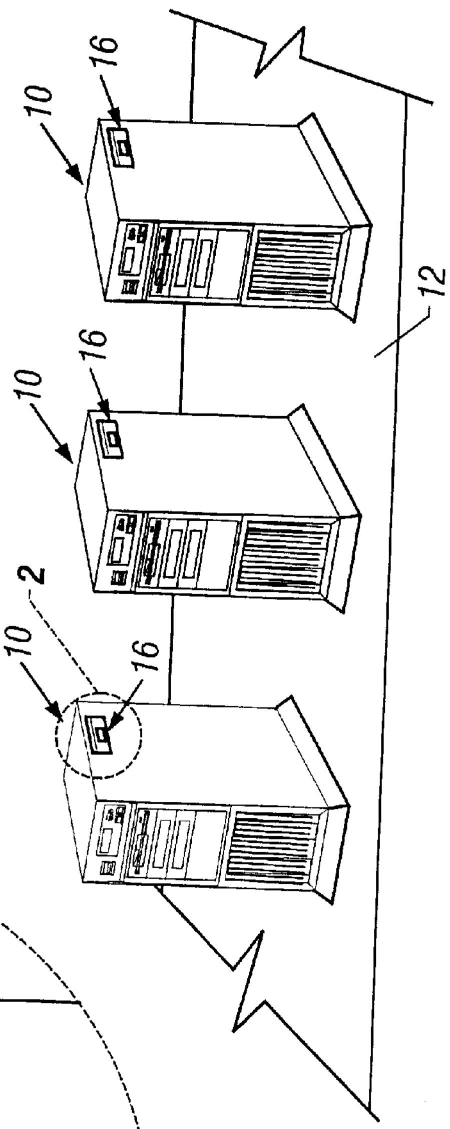
FIG. 1 is an isometric view of a manufacturing assembly line for computers according to an embodiment.

FIG. 1 depicts an assembly line for manufacturing electronic devices, such as computers 10, which are sequentially moved, via a conveyor belt 12, to various successive work stations, during the manufacturing process. The computers 10 are shown at a work station at an early stage of the manufacturing process.

Figure 2:
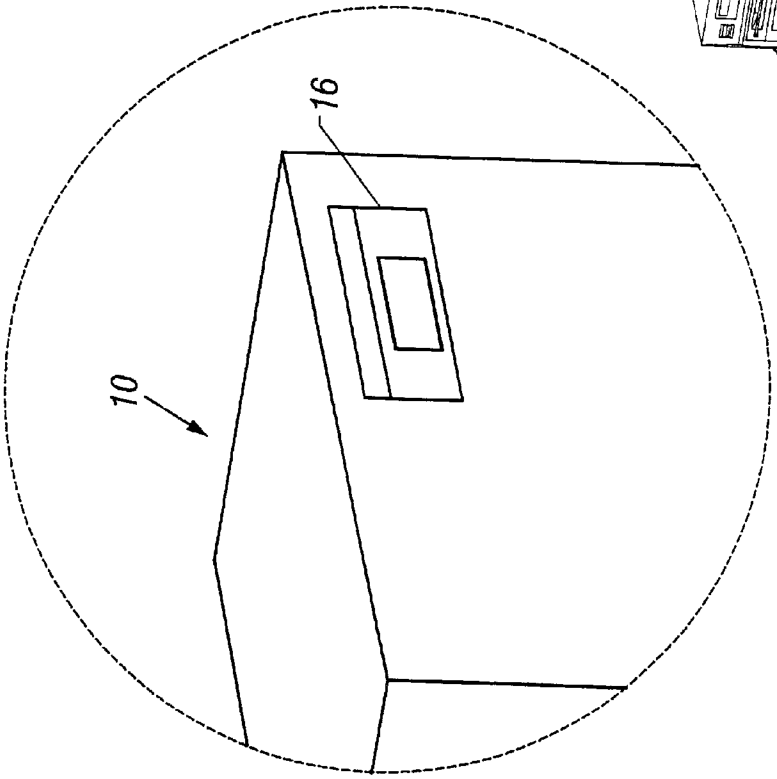
FIG. 2 is an enlarged view of a portion of one of the computers of FIG. 1 as indicated by the circle 2.

A temporary patch 16 is attached to each computer 10 in an upper corner of a side wall of each computer as shown in FIG. 2 in connection with one of the computers 10. Each patch 16 has an adhesive backing which enables it to be manually pressed against the side wall surface, causing the adhesive, and therefore the patch, to adhere to the latter surface.

Figure 3:
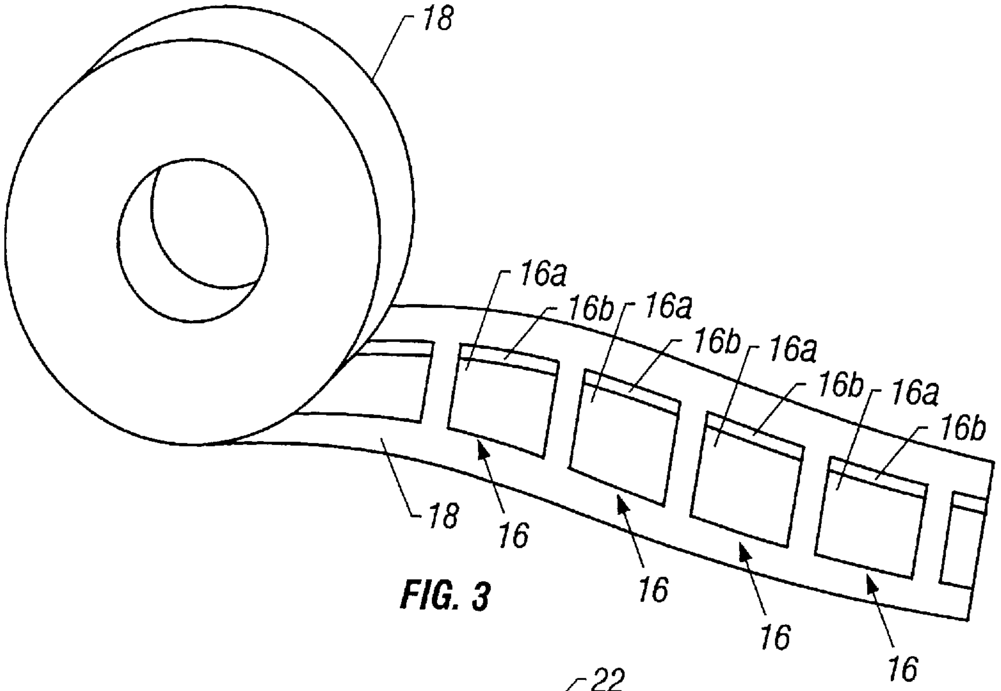
FIG. 3 is an enlarged view of a roll of temporary patches used in the embodiment of FIGS. 1 and 2.

FIG. 3 depicts a roll of backing material 18, such as paper, or the like, to which a plurality of patches 16 are adhered by the above-mentioned adhesive backing. Each patch 16 consists of a base sheet 16*a* and a tab 16*b* extending from the upper marginal edge of the base sheet. A coat of the aforementioned adhesive is applied to the back surface (not shown) of the base sheet 16*a* to form the above-mentioned adhesive backing, and to the front of the base sheet as shown, with the tab 16*b* being free of the adhesive. The significance of the adhesive on the front surface of the base sheet, as well as the non-adhesive tab 16*b,* will be described in detail. The patches 16 are retained on the roll 18 during non-use and before they are applied to the computers 10.

Figure 4:
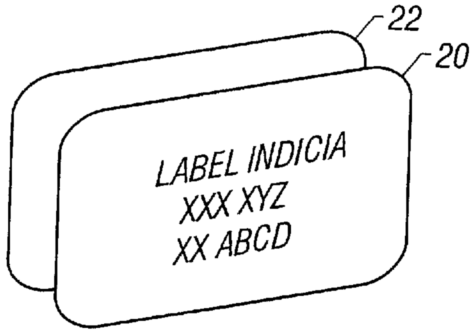
FIG. 4 is a isometric view of a label used in the embodiment of the FIGS. 1 and 2.

As shown in FIG. 4, a permanent tag, or label, 20 is provided and receives indicia, or the like, on its front surface 20*a*. It is understood that the back surface of the label 20 is provided with adhesive, and a backing sheet 22, of essentially the same dimensions as the label, is provided for covering the adhesive-coated back surface of the label during non-use of the label. The backing sheet 22 is shown slightly separated from the label in FIG. 4 for the convenience of presentation.

Figure 5:
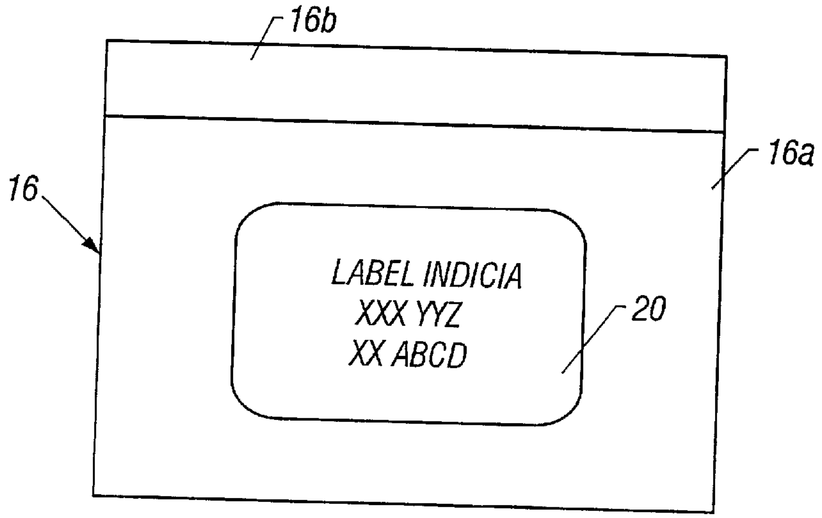
FIG. 5 is an enlarged view of a patch depicting a label attached thereto.

As shown in FIG. 5, the backing sheet 22, with the label 20 adhered thereto, is adhered to the front surface of the base sheet 16*a* of each patch 16, by the adhesive on the latter surface. The dimensions of the backing sheet 22 and the label 20 are preferably less than those of the base sheet 16*a* of the patch 16 to facilitate the application of the label 20 to the patch 16, and to ensure that the entire label 20 is contained within the adhesive-coated front surface of the base sheet 16*a*.

During the process of manufacturing the computers 10, at the work station shown in FIG. 1, a worker removes a patch 16 from the roll 18 and applies it to a surface of the computer 10 as shown. The label 20, with the backing sheet 22 adhered thereto, is then applied to the adhesive on the front of the base sheet 16*a* of the patch, with the latter adhesive adhering the backing sheet 22, and therefore the label 20, to the patch 16. It is understood that this step is done at an early stage of the manufacturing process, and that the label 20 contains indicia which must be available to the workers on the assembly line during later stages of the manufacturing process.

The computers 10, each with a label 20 adhered thereto in the above manner, are then advanced, via the conveyor belt 12, along the assembly line and through various other stages of the manufacturing process. The computers 10 are then advanced to a work station on the assembly line where a worker manually grips the non-adhesive tab 16*b* of the patch 16, and removes the patch, with the backing sheet 22, and therefore the label 20, attached thereto. The worker then peels the label 20 from the backing sheet 22, discards the patch 16 and the backing sheet adhered thereto, and permanently applies the label 20, with its adhesive backing, to the computer 10, preferably at the same general area where the patch was placed.

Thus, according to this method, a label 20 is temporarily attached, via a patch 16, to a computer 10, and stays with the computer during the majority of the manufacturing process, after which the label is permanently attached to the computer at a late stage of the process. Thus, if the label 20 is damaged, or if the computer 10 fails or is damaged during the manufacturing process between the time that the label 20 is temporarily placed on it, and the time that the label should be permanently applied, the label is saved and can be used on another computer.

Thus, according to the method of the present disclosure, considerable cost-savings are realized, especially in a manufacturing environment in which great numbers of devices, such as the computers, are manufactured utilizing relatively expensive labels.

It is understood that variations may be made in the foregoing without departing from the scope of the embodiments disclosed herein. For example, the method is not limited to the manufacture of computers, but is equally applicable to a wide variety of devices. Also, the location of the patch 16 and the labels 20 on the device being manufactured can vary within the scope of the embodiments. Further, the relative dimension of the patches 16 and the labels 20 can vary. It is also understood that the spatial references referred to above, such as "upper", "front", "back", etc. are made for the purposes of example only and are not intended to limit the specific orientation of the particular structure involved.

Because other modifications, changes, and substitutions are intended in the foregoing disclosure, it is appropriate that the appended claims be construed broadly and in a manner consistent with the scope of the disclosed embodiments.

What is claimed is:

1. A method of labeling a device, comprising:

providing a patch having adhesive applied to opposite surfaces;

adhering one of the surfaces to a surface of the device;

providing a label having adhesive on one surface;

applying one surface of a backing sheet to the one surface of the label to adhere the backing sheet to the label;

adhering another surface of the backing sheet to another surface of the patch;

removing the patch, with the backing sheet, and therefore the label, adhered thereto, from the device;

removing the label from the backing sheet; and then adhering the label to the device.

2. The method of claim 1 further comprising providing a tab on the patch that is free from adhesive.

3. The method of claim 2 wherein removing the patch is performed by manually gripping the tab and pulling on the tab.

4. The method of claim 1 wherein the one surface and the other surface of the patch are opposite surfaces.

5. The method of claim 1 wherein the one surface and the other surface of the backing sheet are opposite surfaces.

6. The method of claim 1 wherein the one surface of the patch is adhered to a surface of the device by the adhesive on the one surface of the patch.

7. The method of claim 1 wherein the one surface of the backing sheet is adhered to the one surface of the label by the adhesive on the one surface of the label.

8. The method of claim 1 wherein the label is adhered to the device by the adhesive on the one surface of the label.

9. The method of claim 1 wherein the surfaces of the backing sheet are free from adhesive.

10. The method of claim 1 further comprising discarding the patch, with the backing sheet adhered thereto, after the removal of the label from the backing sheet.

11. The method of claim 1 wherein the device is a computer.

12. A method of manufacturing a device comprising:

sequentially passing the device to a plurality of work stations;

providing a patch having adhesive applied to opposite surfaces;

adhering one of the surfaces to a surface of the device at a work station;

providing a label having adhesive on one surface;

applying one surface of a backing sheet to the one surface of the label to adhere the backing sheet to the label;

adhering another surface of the backing sheet to another surface of the patch at the work station;

passing the device to another work station;

removing the patch, with the backing sheet, and therefore the label, adhered thereto, from the device at the other work station;

removing the label from the backing sheet; and adhering the label, by the adhesive on the one surface thereof, to the device at the other work station.

13. The method of claim 12 further comprising placing the device on a conveyor, and advancing the device from the first-mentioned work station to the other work station by the conveyor.

14. The method of claim 12 further comprising providing a tab on the patch that is free from adhesive.

15. The method of claim 14 wherein removing the patch is performed by manually gripping the tab and pulling on the tab.

16. The method of claim 12 wherein the one surface and the other surface of the patch are opposite surfaces.

17. The method of claim 12 wherein the one surface and the other surface of the backing sheet are opposite surfaces.

18. The method of claim 12 wherein the one surface of the patch is adhered to a surface of the device by the adhesive on the one surface of the patch.

19. The method of claim 12 wherein the one surface of the backing sheet is adhered to the one surface of the label by the adhesive on the one surface of the label.

20. The method of claim 12 wherein the label is adhered to the device by the adhesive on the one surface of the label.

21. The method of claim 12 wherein the surfaces of the backing sheet are free from adhesive.

22. The method of claim 12 further comprising discarding the patch, with the backing sheet adhered thereto, after the removal of the label from the backing sheet.

23. The method of claim 12 wherein the device is a computer.

* * * * *